(12) United States Patent
Gärtner et al.

(10) Patent No.: US 10,962,940 B2
(45) Date of Patent: Mar. 30, 2021

(54) SYSTEM AND METHOD FOR DETECTING FAULTS AND/OR FOR PROVIDING OPTIMIZATION MEASURES TO ENHANCE THE PERFORMANCE OF ONE OR MORE BUILDINGS

(71) Applicant: Siemens Schweiz AG, Zürich (CH)

(72) Inventors: Robert Gärtner, Oberägeri (CH); Henrik Cohen Jensen, Longens Lyngby (DK)

(73) Assignee: Siemens Schweiz AG, Zurich (CH)

( * ) Notice: Subject to any disclaimer, the term of this patent is extended or adjusted under 35 U.S.C. 154(b) by 784 days.

(21) Appl. No.: 15/657,347

(22) Filed: Jul. 24, 2017

(65) Prior Publication Data
US 2018/0039238 A1    Feb. 8, 2018

(30) Foreign Application Priority Data
Aug. 3, 2016 (EP) .................................. 16182491

(51) Int. Cl.
G05B 13/04 (2006.01)
G06F 16/25 (2019.01)
G06F 16/22 (2019.01)
G05B 23/02 (2006.01)

(52) U.S. Cl.
CPC ....... G05B 13/041 (2013.01); G05B 23/0251 (2013.01); G06F 16/2246 (2019.01); G06F 16/252 (2019.01)

(58) Field of Classification Search
CPC .............. G05B 13/041; G05B 23/0251; G06F 16/2246; G06F 16/252

USPC ............................................................ 703/1
See application file for complete search history.

(56) References Cited

U.S. PATENT DOCUMENTS

| | | | |
|---|---|---|---|
| 8,532,808 B2 | 9/2013 | Drees et al. | |
| 8,532,839 B2 | 9/2013 | Drees et al. | |
| 8,600,556 B2 | 12/2013 | Nesler et al. | |
| 8,731,724 B2 | 5/2014 | Drees et al. | |
| 8,755,943 B2 | 6/2014 | Wenzel | |

(Continued)

FOREIGN PATENT DOCUMENTS

| | | |
|---|---|---|
| CN | 1733597 A | 2/2006 |
| CN | 101198989 A | 6/2008 |

(Continued)

OTHER PUBLICATIONS

Dawson-Haggerty, "Building Operating Systems Services: An Architecture for Programmable Buildings" Technical Report No. UCB/EECS-2014-96, May 16, 2014, 152 pages. (Year: 2014).*

*Primary Examiner* — Suzanne Lo

(57) ABSTRACT

Method and system is provided for detecting faults and/or providing optimization measures to enhance the performance of one or more buildings, especially building automation equipment of the one or more buildings. The system may include a database for storing a data model comprising asset and performance data of the one or more buildings. The data model may be represented in one or more hierarchical tree-structures, in which the nodes of the tree-structures represent asset data and the leaves of the tree-structures represent performance data of the one or more buildings. The performance data may be represented in each case by data points. The data points may include time series of measured or derived field values and meta information.

17 Claims, 15 Drawing Sheets

(56) References Cited

U.S. PATENT DOCUMENTS

| | | |
|---|---|---|
| 8,788,097 B2 | 7/2014 | Drees et al. |
| 8,843,238 B2 | 9/2014 | Wenzel et al. |
| 9,069,338 B2 | 6/2015 | Drees et al. |
| 9,196,009 B2 | 11/2015 | Drees et al. |
| 9,286,582 B2 | 3/2016 | Drees et al. |
| 9,298,203 B2 | 3/2016 | Wenzel |
| 9,322,566 B2 | 4/2016 | Wenzel et al. |
| 9,348,392 B2 | 5/2016 | Drees et al. |
| 9,429,927 B2 | 8/2016 | Nesler et al. |
| 9,475,359 B2 * | 10/2016 | Mackay ............... G06T 19/00 |
| 9,568,910 B2 | 2/2017 | Drees et al. |
| 9,575,475 B2 | 2/2017 | Drees et al. |
| 9,606,520 B2 | 3/2017 | Noboa et al. |
| 9,639,413 B2 | 5/2017 | Drees et al. |
| 2011/0178977 A1 * | 7/2011 | Drees ............... G05B 23/0229 706/52 |
| 2017/0102693 A1 * | 4/2017 | Kidd ............... G05B 19/41865 |

FOREIGN PATENT DOCUMENTS

| | | |
|---|---|---|
| CN | 101916093 A | 12/2010 |
| CN | 103020873 A | 4/2013 |
| WO | 2015181338 A1 | 12/2015 |

\* cited by examiner

FIG 10

Runtime Settings

Define the Runtime Settings - these are displayed at runtime in the Runtime Settings Dialog

| Abbrevation | Description | Type | Value | Unit |
|---|---|---|---|---|
| temperatureE... | Temperature Error Tolerance | DOUBLE | 0 | Delta °F |
| temperatureR... | Temperature Rice across Return Fan | DOUBLE | 0 | Delta °F |
| thresholdHHV | Threshold error heating coil valve | DOUBLE | 0 | |
| thresholdCCV | Threshold error cooling coil valve | DOUBLE | 0 | |
| electricEnerg... | Electric Energy Rate | DOUBLE | 0 | $ |
| utilityEnergyR... | Utility Energy Rate | DOUBLE | 0 | $ |
| thresholdMin... | Threshold error minimum outdoor air fraction | DOUBLE | 0 | |
| thresholdErro... | Threshold error ratio of flows | DOUBLE | 0 | |
| thresholdNor... | Threshold error normalized damper control signal | DOUBLE | 0 | |
| maxModeCh... | Maximum number of mode changes per hour | INT | 0 | |
| temperatureR... | Temperature Rice across Supply Fan | DOUBLE | 0 | Delta °F |
| lowerEconLo... | Lower Econ Lockout | DOUBLE | 0 | °F |
| upperEconLo... | Upper Econ Lockout | DOUBLE | 0 | °F |
| * | | | | |

LRS

[ OK ]  [ Cancel ]

FIG 11

Calculated Fields for Script

Define the Calculated Fields - these are accessible from Data Points and Tagging Calc.Fields | Node Specific Settings

| Name | Type | Expression | Aggregation | Publish | ..in Tree | ..in Stat | Sequence | Display Unit | Formatting |
|---|---|---|---|---|---|---|---|---|---|
| Node Type | STRING | return lcc!= null && lc... | None ▸ | ☑ | ☐ | ☐ | 2 | ▸ | |
| Exceptions | DOUBLE | return errorPeriods.C... | UseRule... ▸ | ☑ | ☑ | ☐ | 8 | ▸ | |
| Duration | DOUBLE | return AnalyticsServe... | UseRule... ▸ | ☑ | ☐ | ☐ | 11 | ▸ | timespan |
| Minimum | DOUBLE | return errorPeriods.M... | Min ▸ | ☑ | ☐ | ☐ | 9 | ▸ | timespan |
| Maximum | DOUBLE | return errorPeriods.M... | Max ▸ | ☑ | ☐ | ☐ | 10 | ▸ | timespan |
| TARGET | STRING | return lcc!= null? lcc... | None ▸ | ☐ | ☐ | ☐ | 0 | ▸ | |
| RULE | STRING | return rule.TK_Name; | None ▸ | ☐ | ☐ | ☑ | 1 | ▸ | |
| Priority | STRING | return rulePriority; | None ▸ | ☐ | ☐ | ☑ | 0 | ▸ | |
| kpiCategory | STRING | return ruleKpiCategory | None ▸ | ☐ | ☐ | ☐ | 0 | ▸ | |
| * | | ▸ | | | | | | | |

Points & Propertiess

| Points | Node Properties | Virtual Points |

Define the Valuetype Data Points of the Script. Hint: Double-Click the "Value Type" or "Name" cell to open the Da

| Value Type | Name | Flow Natures | Unit | Resolution | Inherit |
|---|---|---|---|---|---|
| Terminal Unit Airflow Percent [100000... | ▶ BOX_AIRFLOW | 32767 | | ▶ i15m | ☐ |
| Terminal Unit Damper Command [... | ▶ BOX_DMP_CMD | 32767 | | ▶ i15m | ☐ |
| Cooling Coil Valve Command [100... | ▶ CLG_VLV_CMD | 32767 | % | ▶ i15m | ☐ |
| Mixed Air Temperature [100000003] | ▶ MAT | 32767 | °F | ▶ i15m | ☐ |
| Mixing Box Dampers Command [1... | ▶ MIX_DMP_CMD | 32767 | % | ▶ i15m | ☐ |
| Occupied Mode [100000002] | ▶ OCC | 32767 | | ▶ i15m | ☐ |
| Supply Air Temperature [100000520] | ▶ SAT | 16383 | °F | ▶ i15m | ☑ |
| Supply Fan Status/Proof [10000001... | ▶ SF_STATUS | 32767 | | ▶ i15m | ☐ |
| Terminal Unit Occupancy Status [1... | ▶ SPACE_OCC | 32767 | | ▶ i15m | ☐ |
| Terminal Unit Occ Cooling Setpoint... | ▶ SPACE_OCC_CLG_T... | 32767 | °F | ▶ i15m | ☐ |
| Terminal Unit Occ Heating Setpoint... | ▶ SPACE_OCC_HTG_T... | 32767 | °F | ▶ i15m | ☐ |
| Terminal Unit Room Temperature [... | ▶ SPACE_TEMP | 32767 | °F | ▶ i15m | ☐ |
| Terminal Unit Room Temperature ... | ▶ SPACE_TEMP_SP | 32767 | °F | ▶ i15m | ☐ |

[ OK ]   [ Cancel ]

| Operations Schedule | | | |
|---|---|---|---|
| Schedule inherited to lower Nodes (0 is top Node). No Operations: Leave out the day, Full operations: 00:00:00 - 00:00:00 | | | |
| ● Workdays  ○ Holydays | | | |
| Day | NodeId | Time from | Time to |
| Monday | ▶ 282458 | 06:00:00 | 18:00:00 |
| Tuesday | ▶ 282458 | 08:00:00 | 20│00:00 |
| | ▶ | | |
| OK | | | Cancel |

UI

SYSTEM AND METHOD FOR DETECTING FAULTS AND/OR FOR PROVIDING OPTIMIZATION MEASURES TO ENHANCE THE PERFORMANCE OF ONE OR MORE BUILDINGS

FIELD OF THE INVENTION

The present invention relates generally to the technical field of building management systems or building automation systems. In particular the present invention relates to systems and methods for detecting faults and/or for providing optimization measures to enhance the performance of one or more buildings, especially the building automation equipment of the one or more buildings.

BACKGROUND

The management of energy by a building automation system (BAS) is the combination of actions taken to maximize energy usage efficiency and optimize energy supply to lower energy costs without sacrificing occupant needs and comfort. To achieve these building performance goals, actions may include reducing end use of energy consuming equipment, increasing efficiency of equipment, eliminating wasted energy, finding less costly alternative energy sources, minimizing procurement costs, or detecting faults in building equipment.

Equipment faults in buildings cause undesirable effects such as e.g. increasing the energy consumption or decreasing the lifespan of equipment. There are known various methods of fault detection, including statistical analysis methods and methods for statistical process control. These methods are often cumbersome to operate or use in or with a BAS, or they require programming experience.

Therefore there is a need for building owners or building operators for easy to use methods or systems for detecting faults and/or for providing optimization measures to enhance the performance of buildings.

SUMMARY OF THE INVENTION

The object of the invention is to provide methods and systems for fault detection and diagnosis which are easy to operate by building operators.

This object will be achieved by a computer-facilitated method for detecting faults, providing optimization measures, or both of the foregoing to enhance the performance of one or more buildings, including building automation equipment disposed in relation to the one or more buildings, the method comprising:
   providing a database (DB) storing a data model comprising asset data and performance data of the one or more buildings, wherein the data model is represented in one or more hierarchical tree-structures each having a plurality of nodes and a plurality of leaves,
   wherein the nodes of the tree-structures represent asset data and the leaves of the tree-structures represent performance data of the one or more buildings,
   wherein the performance data are represented in each case by data points, wherein the data points comprise time series of measured or derived field values and meta information;
   providing a user interface for configuring rules for analyzing the asset data and the performance data in respect to the building performance of the one or more buildings, wherein the rules refer to data point mappings, parameters, asset data mappings, runtime settings, or schedules and are configured by user input using logical operators and defined functions;
   generating executable code modules at runtime based on the user configured rules by a processing unit, wherein the rules are executed by a runtime system traversing the tree-structures of the data model; and
   outputting detected faults and/or optimization measures regarding the one or more buildings on an output device.

The object will be further achieved by a system for detecting faults, providing optimization measures, or both of the foregoing to enhance the performance of one or more buildings, including building automation equipment disposed in relation to the one or more buildings, the system comprising:
   a database storing a data model comprising asset data and performance data of the one or more buildings, wherein the data model is represented in one or more hierarchical tree-structures each having a plurality of nodes and a plurality of leaves,
   wherein the nodes of the tree-structures represent asset data and the leaves of the tree-structures represent performance data of the one or more buildings,
   wherein the performance data are represented in each case by data points, wherein the data points comprise time series of measured or derived field values and meta information;
   a user interface for configuring rules for analyzing the asset data and the performance data in respect to the building performance of the one or more buildings, wherein the rules refer to data point mappings, parameters, asset data mappings, runtime settings, or schedules and are configured by user input using logical operators and defined functions;
   a processing unit for generating executable code modules at runtime based on the user configured rules, wherein the rules are executed by a runtime system traversing the tree-structures of the data model; and
   an output unit for outputting detected faults, providing optimization measures, or both of the foregoing for the one or more buildings.

The object will be further achieved by a script builder tool for generating executable code modules for detecting faults, providing optimization measures, or both of the foregoing to enhance the performance of one or more buildings, the script builder tool comprising:
   a database storing a data model comprising asset data and performance data of one or more buildings, wherein the data model is represented in one or more hierarchical tree-structures each having a plurality of nodes and a plurality of leaves, wherein the nodes of the tree-structures represent asset data and the leaves of the tree-structures represent performance data of the one or more buildings, wherein the performance data are represented in each case by data points, wherein the data points comprise time series of measured or derived field values and meta information;
   a user interface for configuring rules for analyzing the asset data and the performance data in respect to the building performance of the one or more buildings, wherein the rules refer to data point mappings, parameters, asset data mappings, runtime settings, or schedules and are configured by user input using logical operators and defined functions;
   a processing unit for generating executable code modules at runtime based on the user configured rules, wherein the rules are executed by a runtime system traversing the tree-structures of the data model.

BRIEF DESCRIPTION OF THE DRAWINGS

The above-mentioned and other concepts of the present invention will now be addressed with reference to the drawings of the preferred embodiments of the present invention. The shown embodiments are intended to illustrate, but not to limit the invention. The drawings contain the following figures, in which like numbers refer to like parts throughout the description and drawings and wherein:

FIG. 10 shows an exemplary list of runtime settings for configuring a script builder tool;

FIG. 11 illustrates an exemplary user interface of a script builder tool for defining calculated fields in data points;

FIG. 12 illustrates a further exemplary user interface for an exemplary script builder tool;

FIG. 14 illustrates an exemplary user interface of a script builder tool for schedule settings;

DETAILED DESCRIPTION

Figure 1:
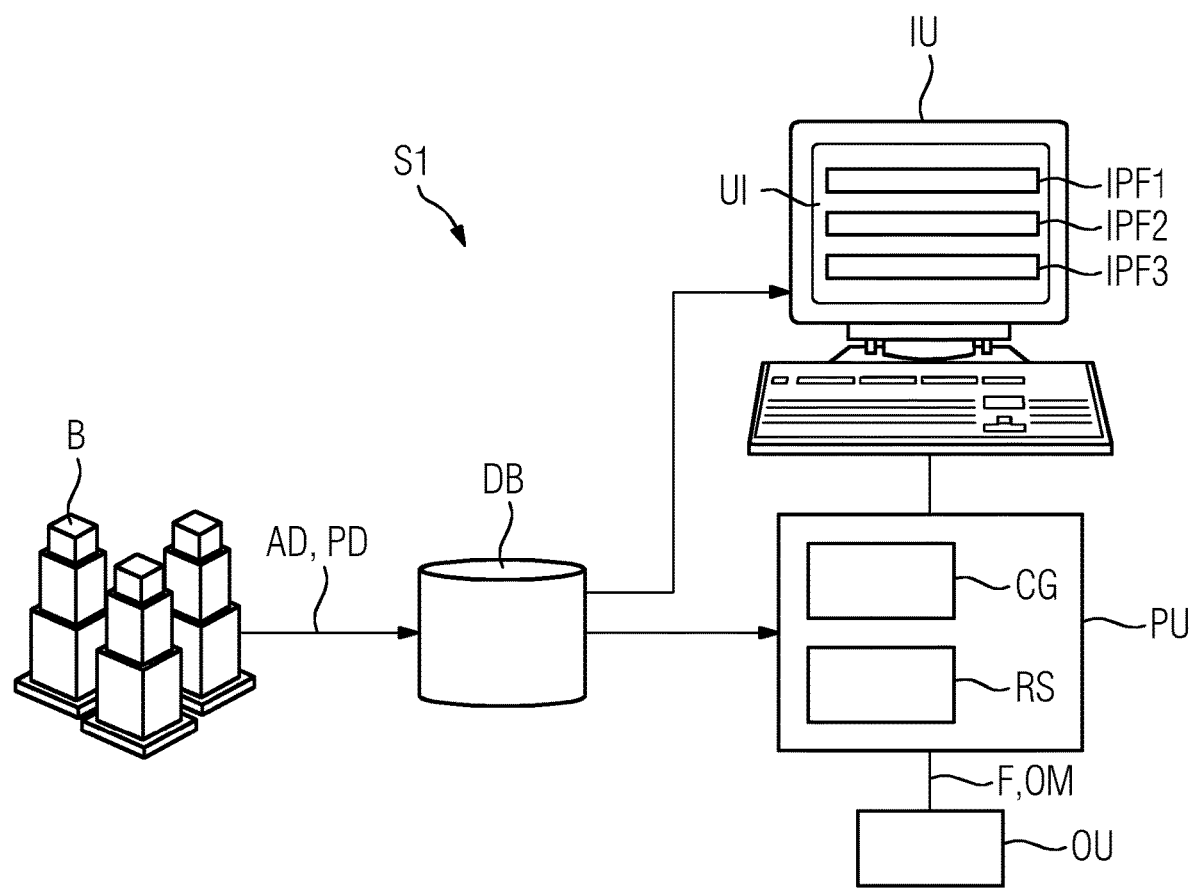
FIG. 1 illustrates a first exemplary schematic overview diagram of a system for detecting faults and/or providing optimization measures to enhance the performance of one or more buildings that depicts various aspects and embodiments of the present invention.

"Smart buildings" generate a lot of traffic and an increasingly large amount of data. Therefore, there is a focus on the performance and optimization of building systems, respectively sub-systems (e.g. air distribution, cooling, heating, lighting) and individual technical infrastructure or equipment within these systems, like air handling units, chillers, boilers, etc. This requires the analysis of huge amounts of time series data (e.g. performance data) and their timely correlation by sophisticated rules to find inefficiencies in operation, deviation from control strategy, or negative impact on the building comfort, for example. System engineers or energy engineers need to analyze the data frequently in order to measure, find faults, or give advice to improve the performance of equipment, sub-systems, systems, or buildings.

A user (e.g. building owner, building operator) therefore is to be expected to know about the individual setup of equipment in terms of its specific type and associated parameters, the available data points, operational schedules, etc. Additionally the user needs to align or normalize the data point time series regarding the required analysis granularity, as the raw data granularity can vary from data point to data point, e.g. time series data can be available as 1-, 5- or 15-minute samples, and the analysis should be advantageously performed in 15-minute intervals, which would require the compression of the higher granular time series to 15-minute values based on a certain compress function, like Sum/Average/Min/Max. The user needs also to ensure that the units of measure of the data series fit to each other across the analysis scenario to perform correct calculations.

Once all the preparatory tasks have been performed and the analytics context has been completely defined and data has been gathered for the period to be analyzed, the actual analysis can start by defining the logic the user wants to apply to the data to detect the anomalies or patterns he is looking for. This logic can be called a rule, and a collection of several rules e.g. for a certain type of system or equipment can be put together in a script. The execution of rules can be limited to certain types of assets (buildings, systems, equipment etc.), or the execution of rules can be designed to a certain asset. To support the mitigation process of faults being detected by technicians or facility managers, the script builder tool advantageously allows the assignment of probable causes (means defects or faults) and potential actions (optimization or improvement measures) that could be taken on a per rule basis.

Advantageously the scripts or rules can be executed even by occasional users for the whole portfolio of buildings, systems, sub-systems, or equipment of a customer at once, and they can be applied to different customers without having to be recreated or re-generated. The results can be presented in various forms like a navigation tree showing aggregated results, an overview grid and/or graphically. To support this goal the script builder tool provides functionality to configure the published data on a per script or rule basis comprising the definition of aggregated information like the number of fault occurrences and durations and the ability to assign the accompanying trend data series which could help the user to better understand the actual conditions when the fault occurred.

Today the execution of such tasks is done one-by-one by a human operator by leveraging spreadsheet tools like MS Excel or scripting solutions with proprietary scripting languages and visually inspecting trend data charts to detect anomalies and patterns. Alternatively an expert can write and test the scripts or rules as he knows the necessary commands and understands the context of the queried data to choose the necessary operands in order to get useful results back or tasks to be executed. If a human operator (e.g. Facility Manager) wants to run specific queries or execute jobs that are relevant for him e.g. to improve the performance of his building or compare buildings with each other, he has to become an expert or ask someone to do the programming job for him.

FIG. 1 illustrates a first exemplary schematic overview diagram of a system S1, especially a FDD-system (Fault Detection and Diagnosis System) for detecting faults and/or providing optimization measures to enhance the performance of one or more buildings B. The exemplary system S1 comprises a database DB storing a data model comprising asset AD and performance data PD of the one or more buildings B, wherein the data model is represented in one or more hierarchical tree-structures. The exemplary system S1 further comprises a user interface UI (advantageously a menu-driven user interface UI) for configuring rules for analyzing the asset AD and the performance data PD in respect to the building performance of the one or more buildings B. The rules referring to data point mappings, parameters, asset data mappings, runtime settings, or schedules which are configured by user input using logical operators and defined functions. The rules are created and configured using an Input Unit IU comprising keyboard, mouse, etc., and the user interface UI. Advantageously the user interface UI provides input fields IPF1-IPF3 for creating and configuring the rules by using logical operators (e.g. "AND", "OR", "EQUAL", "GREATER", "SMALLER") and defined functions, e.g. predefined macros or subroutines.

The exemplary system S1 furthermore comprises a processing unit PU for generating executable code modules (e.g. dll, "Dynamic Link Libraries") at runtime based on the user configured rules. The rules are executed by a runtime system traversing the tree-structures of the data model. In the illustration according to FIG. 1 the module code generator CG comprises a rule engine for checking the syntax of the rules and for assembling the rules to an executable script. The module code generator CG further comprises a module for code generation to automatically generate executable code modules (e.g. dll files or exe files) to run the script on the respective runtime system RS. The runtime system RS is configured to run the generated code modules (e.g. dll files or exe files) on the processing unit PU. The processing unit PU can be for instance a Personal Computer (PC) or a Workstation. The processing unit PU is equipped and configured with appropriate hardware and software components. The PU can also be implemented in a cloud computing environment.

The database DB which stores the data model comprising asset AD and performance data PD of the one or more buildings B can be integrated in a memory (e.g. drive or flash memory) of the processing unit PU. The database DB could also be stored in an in an In-Memory-Database of the processing unit PU. Storing the database DB an In-Memory-Database of the processing unit PU is especially advantageous for applications which require very high response times for providing faults to the user.

In the exemplary embodiment according to FIG. 1 the processing unit PU has access to the database DB via an adequate communication interface (e.g. a wireless or radio connection). The database DB could also be implemented in a cloud. This allows the sharing of the resource database DB to more than one processing units PU. A provider of the resource database DB (including the respective data model comprising asset AD data and performance PD data of one or more buildings B) could provide the content of the database DB for customer as software-as-a-service.

Advantageously the content of the database DB, means the data model comprising asset AD and performance data PD of the one or more buildings B is arranged in one or more tree-structures each having a plurality of nodes and a plurality of leaves. The nodes of the tree-structures represent asset data AD and the leaves of the tree-structures represent performance data PD of the one or more buildings B. In the one or more tree-structures the performance data PD are represented in each case by data points, the data points comprising time series of measured or derived field values and meta information of the technical equipment (e.g. HVAC equipment) of the one or more buildings B.

The asset data AD of the one or more buildings B comprise information regarding the technical infrastructure or technical equipment for climate control (HVAC), and/or access control, and/or energy supply and control, and/or security and/or fire safety of the one or more buildings B. The asset data AD of the one or more buildings B include but are not limited to one or more of the following: passive data (e.g. types and quantities of employed systems, subsystems, components equipped in the one or more buildings B), setting data, weather data, energy tariff rates (e.g. energy prices) or emission factors (e.g. $CO_2$). Since asset data AD of a building B do not change very frequently, the asset data AD can be submitted to the database DB for instance by an update batch (e.g. daily, weekly, monthly) or if the building B is equipped with a piece of newly installed or changed infrastructure device.

The performance data PD of the one or more buildings B comprise: building control system data, and/or electricity metering data, and/or heat metering data, and/or water metering data, and/or temperature data, and/or humidity data, and/or pressure data, and/or events, and/or alarms. This listing is not limited. The performance data PD regarding the technical equipment have to be monitored permanently to derive reliable conclusions regarding the detection faults or defects of the technical equipment in a building B. Advantageously the performance data PD are submitted to the database DB in a resolution in between 1 and 60 minutes, in particular in a resolution in between 1 and 15 minutes. This enables a fast response to time critical requests or time critical applications in providing detected faults F and/or optimization measures OM for a customer. The asset AD and the performance data PD of the one or more buildings B can be submitted to the database advantageously by a wireless communication connection (e.g. adequate radio connection). Adequate wired communication connections can also be used.

The exemplary system S1 further comprises an output unit OU for outputting detected faults F and/or providing optimization measures OM regarding the one or more buildings B. The output unit OU could be a display of a computer monitor, a display of a tablet computer, a display of a handheld device (e.g. Smartphone), or the display of a monitor station of a building automation system or building management system (e.g. Desigo CC).

Figure 2:
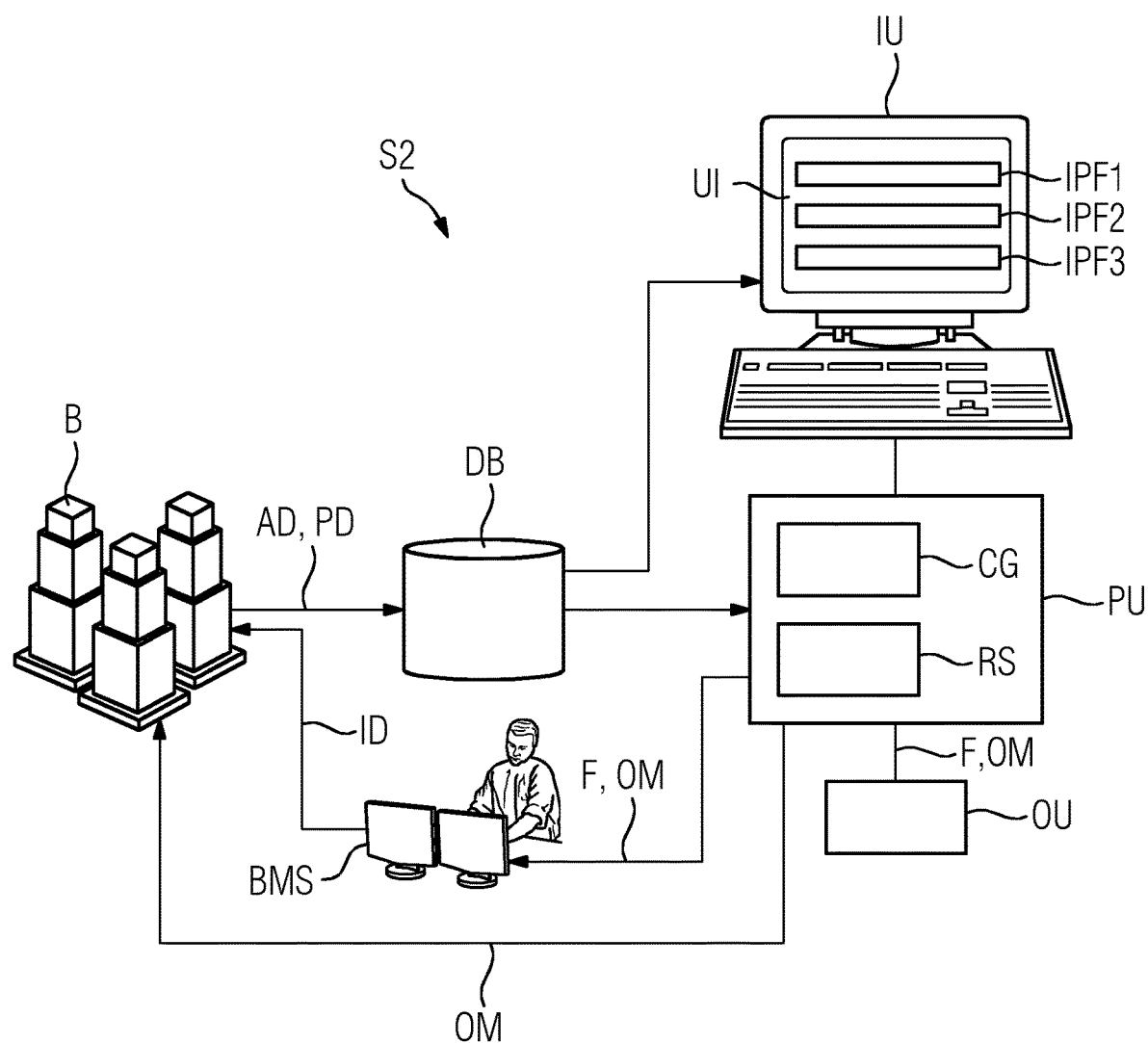
FIG. 2 illustrates a second exemplary schematic overview diagram of a system for detecting faults and/or providing optimization measures to enhance the performance of one or more buildings that depicts various aspects and embodiments of the present invention, including the integration of the system to a building management system (BMS)

FIG. 2 illustrates a second exemplary schematic overview diagram of a system S2 for detecting faults F and/or providing optimization measures OM to enhance the performance of one or more buildings B. Compared to the system S1 illustrated in FIG. 1, the system S2 illustrated in FIG. 2 is additionally connected or integrated to a building management system BMS. A building management system BMS controls and/or monitors the technical equipment (e.g. mechanical or electrical devices) and sub-systems (e.g. power systems, security systems, heating systems, ventilation systems, or evacuation systems) of the one or more buildings B. Advantageously the detected faults F and/or the optimization measures OM are inputted directly (online) into the building management system BMS for operating the one or more buildings B. The detected faults F and/or the optimization measures OM can also be reported offline (e.g. as a daily update batch) into the building management system BMS. Based on the detected faults F and/or the optimization measures OM the building management system BMS can derived or create improvement data ID in an adequate granularity for the respective technical infrastructure affected by the detected faults F or optimization measures OM.

In a further advantageous embodiment the optimization measures OM are inputted directly to the respective affected technical automation equipment of the one or more buildings B. This can be realized via suitable communication means (e.g. Internet or radio communication) in an online (real time) mode or in an offline (batch mode). To engage directly online or in real time to recognized affected or defect technical automation equipment of the one or more buildings B is especially advantageous if the derived optimization measures OM are easily to implement, e.g. switching on or off of a device or sub-system in the one or more buildings B.

Figure 3:
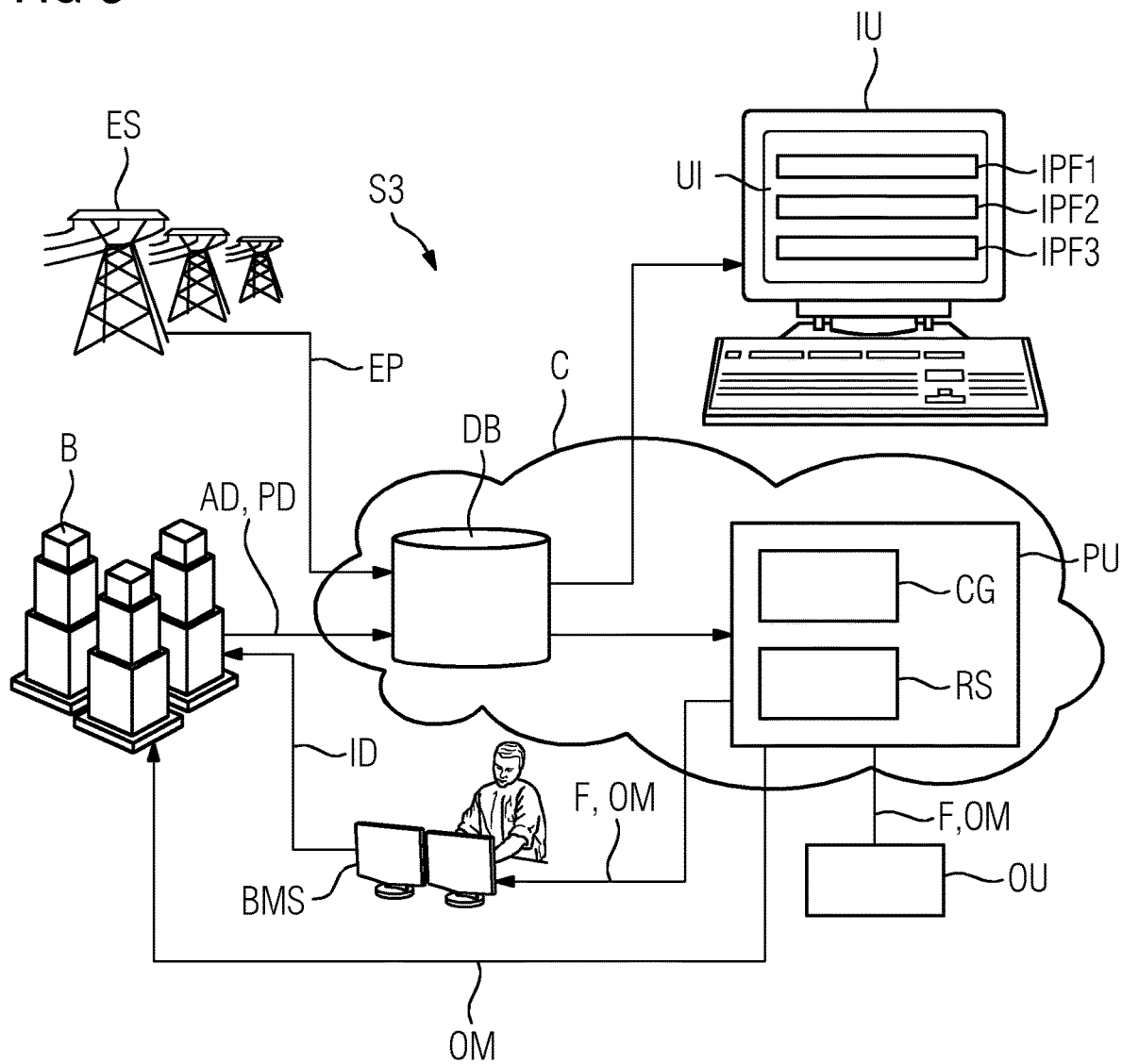
FIG. 3 illustrates a third exemplary schematic overview diagram of a system for detecting faults and/or providing optimization measures to enhance the performance of one or more buildings that depicts various aspects and embodiments of the present invention, including the integration of the processing unit and the database in a cloud.

FIG. 3 illustrates a third exemplary schematic overview diagram of a system S3 for detecting faults and/or providing optimization measures to enhance the performance of one or more buildings B that depicts various aspects and embodiments of the present invention, especially the integration of the processing unit PU and the database DB in a cloud C. Advantageously the infrastructure of cloud C is implemented Internet-based and the database DB is realized as remotely accessible database server or file server. Advantageously the processing unit PU is realized as a server computer offering diagnosis services to the respective clients (e.g. building operators, building owners, facility manager).

The processing unit PU and the database DB of the FDD system S3 can be integrated or be part of a service platform system which is realized as a cloud based platform, wherein the infrastructure and/or the platform and/or the software programs (or parts of the infrastructure or of the platform or of the software) are provided by a cloud service provider.

Advantageously the database DB comprises not only asset data AD and performance data PD of the one or more buildings B, but also energy prices EP provided by a utility or an energy supplier ES. Advantageously the database DB comprises also weather data, weather forecast data, or data regarding consumable resources (e.g. water, fuel) utilized in the one or more buildings B. The weather data can be provided by a weather data or weather forecast provider. This can be a private and/or a public provider.

Figure 4:
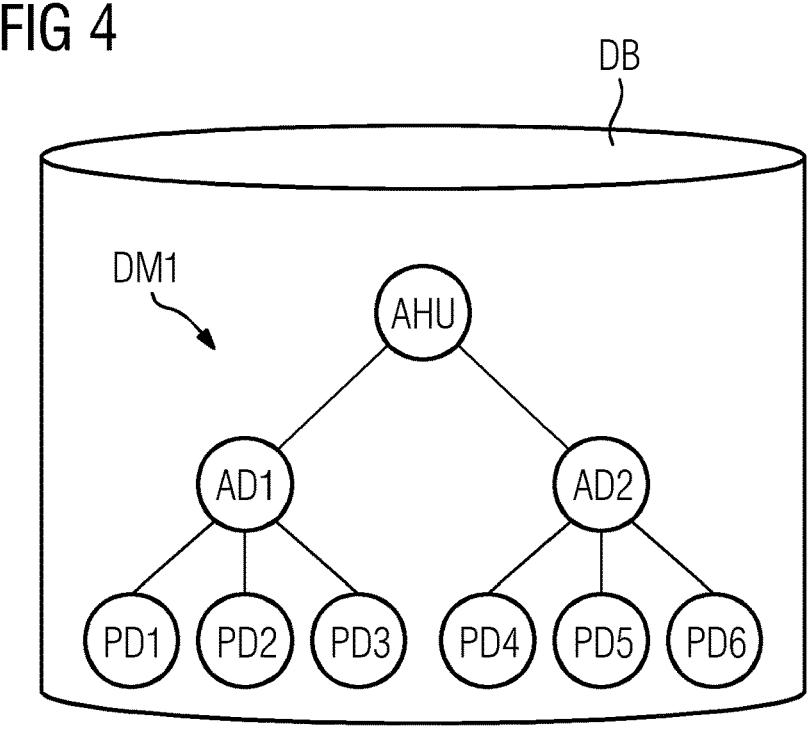
FIG. 4 illustrates a first exemplary database storing a data model comprising asset data and performance data of the one or more buildings, wherein the data model is represented in one or more hierarchical tree-structures in accordance with disclosed embodiments of the present invention.

FIG. 4 illustrates a first exemplary database DB storing a first exemplary data model DM1 comprising asset and performance data of the one or more buildings. The data model DM1 is represented in one or more hierarchical tree-structures, wherein the nodes AHU, AD1, AD2 of the tree-structures represent asset data and the leaves of the tree-structures represent performance data of the one or more buildings. The performance data PD1-PD6 of the technical equipment of the one or more buildings are represented in each case by data points, wherein the data points comprising time series of measured or derived field values and meta information of the technical equipment. The exemplary data model DM1 shows a tree-structure for an exemplary schematic air handling unit AHU equipped in a building B. The illustrated exemplary schematic air handling unit AHU comprises two exemplary sub-systems. For instance a heating sub-system (e.g. a boiler) and a cooling sub-system (e.g. a chiller). The heating sub-system and the cooling sub-system are represented in the data model DM1 as asset data AD1 respectively AD2. For example, asset data AD1 does represent the heating sub-system, and asset data AD2 the cooling sub-system of the air handling unit AHU. To the asset data AD1 representing the heating sub-system the performance data PD1-PD3 are assigned. The performance data PD1-PD3 represent exemplary data points of the heating sub-system of the air handling unit AHU. The data points comprise time series of measured or derived field values and meta information of the exemplary heating sub-system of the air handling unit AHU. The performance data PD1-PD3 of the heating sub-system AD1 can be e.g. air temperature, air velocity, and air humidity. The performance data PD4-PD6 assigned to asset data AD2 can be e.g. the corresponding measures regarding air temperature, air velocity, and air humidity of the cooling sub-system AD2 of the air handling unit AHU.

According to the infrastructure equipped in the one or more buildings B the exemplary data model DM1 can comprise more than one tree-structures. The inventive script builder tool traverses or crawls through the data model DM1 to collect the required asset data AD1, AD2 and performance data PD1-PD6 for the respective rules built by a user by using an adequate user interface.

The leaves PD1-PD6 in a tree-structure of the data model DM1 can also comprise virtual data points. Virtual data points can be e.g. a derived time series. An example of a virtual data point is e.g. the difference of the values of two data points, e.g. the difference of inlet temperature and return temperature. By using virtual data points the clarity of rules can be increased.

Figure 5:
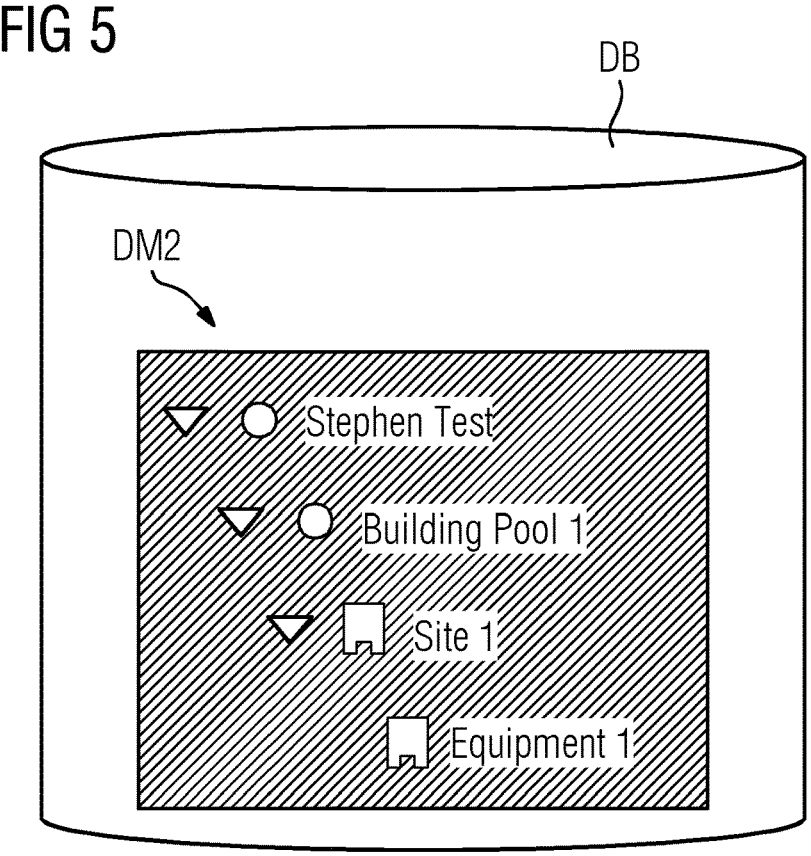
FIG. 5 illustrates a second exemplary database storing a data model comprising asset data and performance data of the one or more buildings, wherein the data model is represented in one or more hierarchical tree-structures in accordance with disclosed embodiments of the present invention.

FIG. 5 illustrates a second exemplary database DB storing a second exemplary data model DM2 comprising asset and performance data of an exemplary "Stephen Test" site or campus. "Stephen Test" site represents the root of the exemplary data model DM2. The exemplary data model DM2 shows in a coarse grain a hierarchical tree-structure with asset data of the "Stephen Test" site or campus. The "Stephen Test" site or campus comprises a "Building Pool 1" which has a "Site 1". The "Site 1" is equipped with "Equipment 1". The performance data assigned to "Equipment 1" are not shown in FIG. 5.

The second exemplary database DB could comprise more than one tree-structures, depending on the quantity and size of the technical infrastructure of the one or more buildings mapped data model DM2.

In the data model DM2 weather data (current, forecast) can be assigned to the nodes as asset data or to the leaves of the tree-structures as performance data, depending on the modeling approach or strategy.

Advantageously energy data (energy price EP, tariff, shortage) are assigned in the data model DM2 to the nodes as asset data. The data assigned to parent nodes are inherited to the child nodes and so on till to the leaves of the tree-structures.

Advantageously the tree structure of the data model DM2 comprises the following levels: Customer, Building Pool, Site, System and Equipment. By implementing this as a standard scenario there is a great chance of success for implementation and execution as the results of customer setups will be more predictable.

Advantageously the data model DM2 allows the user the ability to setup up unlimited different levels of a hierarchical structure (Example: Customer>Region>Building>Floor>Zone>ACME Enterprise, ACME Manufacturing, ACME Region, ACME State, ACME Campus, ACME Building, System, Floor, Zone, Point).

Advantageously the tree hierarchy is be able to display numerical data next to the tree node name and the user shall be able to select what data parameters they would like to see (Example: Duration or Cost or Number of Faults or Trends).

Advantageously the user is able to select a custom data field to be aggregated and displayed in the tree to the right of the Node Names.

Figure 6:
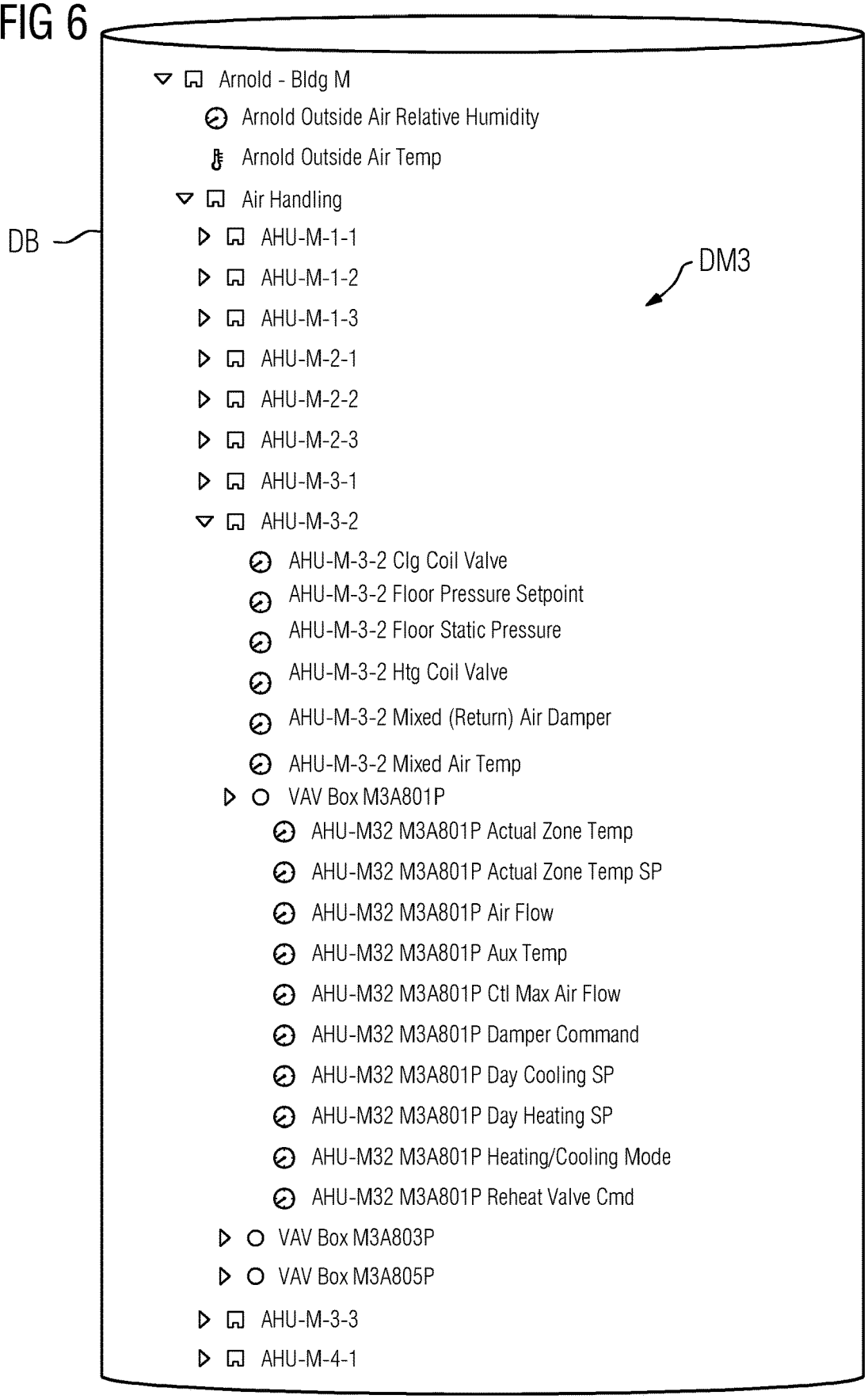
FIG. 6 illustrates a third exemplary database storing a data model comprising asset data and performance data of the one or more buildings, wherein the data model is represented in one or more hierarchical tree-structures in accordance with disclosed embodiments of the present invention.

FIG. 6 illustrates a third exemplary database DB storing an exemplary data model DM3 comprising asset and performance data of the one or more buildings, wherein the data model is represented in one or more hierarchical tree-structures in accordance with disclosed embodiments of the present invention. The data model DM3 represents an exemplary "Arnold Building" having the root node "Arnold-Bldg M". To the root node "Arnold-Bldg M" are exemplary performance data "Arnold Outside Air Relative Humidity" and "Arnold Outside Air Temp" assigned. The "Arnold Building" comprises exemplary infrastructure for air handling which is represented in the data model DM3 with the node "Air Handling". The exemplary infrastructure for air handling comprises air handling units represented in the data model DM3 with the nodes "AHU-M-1-1" to "AHU-M-4-1". In FIG. 6 the node "AHU-M-3-2" illustrates further exemplary sub-structures.

Rules are only executed on nodes where the node type matches the node types the rule is enabled for, e.g. a rule for the evaluation of AHU's is only executed on the nodes "AHU-M- . . . " in the example according to FIG. 6 and not on VAV nodes "VAV Box . . . ". The respective nodes in the tree structure are being identified by metadata, in this example by the type of the node. Any metadata property of the assets can be used to control the scope of execution of the rules. While executing a rule on a relevant node the performance data directly related to this node is typically being used for the evaluation of the rule expression.

Common performance data points like the "Outside Air Relative Humidity" and "Outside Air Temperature", which are for example only defined on the building level, can also be referenced by the rules executed on lower level nodes of the tree hierarchy. This is supported by the inheritance principles/functionality provided by the runtime system. Another important functionality of the runtime system is the aggregation. Aggregation allows a rule to reference performance data of lower level nodes e.g. VAV's for the execution on a higher level node e.g. AHU. Several aggregation functions are supported e.g. Average/Sum/Min/Max.

In the following an example for a rule regarding an exemplary air handling unit and possible Impact of detected faults is shown.

Example for AHU Rule:
Avg Zone Temp Lower Than RAT Average of zone air temperatures for zones served by the AHU is lower than AHU return air temperature
Rule Expression:

```
And(
GT(SF_STATUS,0),
LT(Average(Children(SPACE_TEMP)),Subtract(RAT,
EPSILON_AIR_TEMP))
);
```

Impact of Detected Faults:
When the average zone air temperature is lower than the AHU return air temperature, it could indicate leakage of hot air into the return air duct or sensor measurement error. This could result in increased energy use especially during the cooling season.

Figure 7:
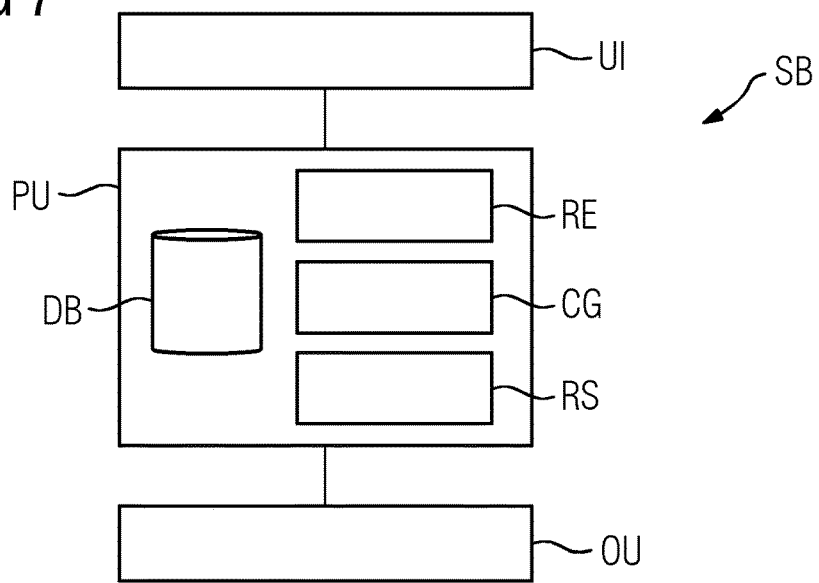
FIG. 7 illustrates an exemplary schematic overview diagram of a script builder tool for generating executable code and/or modules for detecting faults and/or for providing optimization measures to enhance the performance of one or more buildings.

FIG. 7 illustrates an exemplary schematic overview diagram of a script builder tool SB for generating executable code and/or executable modules for detecting faults and/or for providing optimization measures to enhance the performance of one or more buildings. The script builder tool SB comprises a database DB for storing a data model comprising asset and performance data of one or more buildings or of a campus. In the database DB the data model is represented advantageously in one or more hierarchical tree-structures, wherein the nodes of the tree-structures represent asset data and the leaves of the tree-structures represent performance data of the one or more buildings. In the data model the performance data are represented in each case by data points comprising time series of measured or derived field values and meta information (meta data). Meta data for a data point of a device installed in a building can be for instance an identification (ID) for the data point, unit of measure, purpose (e.g. inlet temperature or return temperature).

Advantageously the data model comprises also weather data (e.g. current weather conditions (e.g. temperature, humidity in the local area of the one or more buildings), weather forecast information for the local area of the one or more buildings). In the data model the weather data can be assigned to the nodes or to the leaves of the tree-structures according to the underlying modeling policy. If the modeling policy is mainly a top-down approach the weather data are advantageously assigned to the nodes. If the modeling policy is mainly a bottom-up approach the weather data are advantageously assigned to the leaves. For instance the weather data can be provided by meteorological offices or weather stations.

Advantageously the data model comprises also energy data (e.g. energy prices, tariffs, shortage) provided by utilities or energy supplier. Advantageously energy prices are assigned to nodes, especially to high level nodes, and the energy price will be inherited to nodes and leaves below this node. A high level node can be e.g. a customer who has a dedicated energy price model negotiated with a utility or an energy supplier. The dedicated energy price model is valid for all equipped infrastructure or devices in the customer's buildings.

Furthermore the script builder tool SB comprises a user interface UI (comprising input and displaying means) for configuring rules to analyze the asset and the performance data in respect to the building performance of the one or more buildings. The rules referring to data point mappings, parameters, asset data mappings, runtime settings, or schedules are configured by user input using logical operators and defined functions. The rules are processed and performed by an adequate rule engine RE. A code generator generates executable code modules (e.g. dll or exe files) at runtime based on the user configured rules. The rules are executed by a runtime system RS by traversing the tree-structures of the data model and collecting and processing the data affected by the respective rules. Advantageously the user interface UI is a menu-driven user interface or in parts a menu-driven user interface.

A script comprises 1 to n rules, for each script a executable code module (e.g. dll) is generated. Generating and executing an executable code module can be performed in one step. Advantageously the executable code module (e.g. dll) is generated and executed at runtime by just-in-time (JIT) compilation. The generated code is executed directly by the runtime system RS. The runtime system RS acts as a host. Just-in-time (JIT) compilation offers a great flexibility for a user and a fast execution time for the generated object or machine code. If there are no changes in data points of the respective performance data generated object or machine code can be reused when a script is performed one more time.

Scripts can be configured by parameters which will be accessed during runtime and by runtime settings. Parameters represent properties which are valid for a node (means an asset, e.g. system, sub-system, technical equipment) and the underlying nodes and leaves. Parameters assigned to a node (parent) will be inherited to underlying nodes and leaves. Runtime settings can be for instance tolerance ranges describing the e.g. the responsiveness of the FDD system.

Advantageously the rule engine RE, the code generator CG, and the runtime system RS are implemented in adequate software modules. The rule engine RE, the code generator CG, the runtime system RS, and the database DB are loadable and storable in a memory of the processing unit PU and the processing unit PU is configured to execute the software modules for the rule engine RE, the code generator CG, and the runtime system RS. For instance the processing unit PU can be a personal computer or a workstation. The rule engine RE, the code generator CG, and the runtime system RS can be implemented in one module. It is also possible to implement the rule engine RE, the code generator CG, and the runtime system RS in each case in a dedicated module. The functions of the rule engine RE and the functions of code generator CG can also be implemented in one module.

Advantageously the processing unit PU is realized by a cloud computing infrastructure comprising mechanisms for data storing, data processing, and data connection, especially for connections from remote sources and/or to remote targets.

Advantageously the script builder tool SB further comprises an output unit OU (e.g. monitor or display of a tablet-computer) for outputting detected faults and/or providing optimization measures for the one or more buildings.

Advantageously the script builder tool SB further comprises an interface for delivering detected faults and/or optimization measures to a building automation system operating the one or more buildings.

Advantageously the script builder tool SB further comprises an interface for delivering detected faults and/or optimization measures directly to the affected technical infrastructure of the one or more buildings.

The delivering of detected faults and/or optimization measures can be realized in real-time or in an update batch (e.g. hourly or daily).

There are different modes to operate the script builder tool SB. The script builder tool SB can provide faults and/or optimization measures on demand, e.g. by a building owner who realizes that the energy bill for his building seems to be too high. The script builder tool SB can also operate in a batch mode e.g. on a daily, weekly, or monthly base. In the batch mode the script builder tool SB runs a batch with a set of rules regularly on defined point of times. The script builder tool SB can also be operated in an online mode. The online mode makes sense for monitoring or checking technical equipment which has to provide a high reliability.

Advantageously the script builder tool SB is able to aggregate the fault metric, number of faults, duration and cost to any node object from the system tree hierarchy (for example, a site would sum number of faults, duration of faults, and cost penalties at and below the site node).

Advantageously the script builder tool SB allows an administrator to define custom data field that can be aggregated to any node object from the system tree hierarchy (for example a data field would be duration or cost).

Advantageously the script builder tool provides the ability to stack repeated faults to display only one line of those faults and provide indication of repeated faults (for example, if the same fault happens 1000 times, the system will stack the faults occurred and display one line for that fault).

The script builder tool SB allows users (e.g. administrator) to create their own rules and activate them for specific pieces of equipment. For example an administrator is person who is responsible for configuring the setup of the script builder SB for a customer. Administrator can also be an advanced customer user who wishes to implement a FDD system (Fault Detection & Diagnosis) on their own.

Advantageously the user interface UI of the script builder tool SB provides a configuration page and the detail page. The configuration page allows the user to define conditions that must be true in order for the rule exception to occur. The detail page allows the user to define all the associated information of the rule.

Advantageously the script builder tool SB provides a user interface UI for any users with no programming knowledge to create new rules utilizing common mathematical & statistical functions. For example this can be enabled by a drag-and-drop or by a drop-down programming environment that allows assembly of simple to complex expressions or rules by simply dragging available data and desired mathematical or logical functions together to produce any allowable combination.

Features (among others) supported by the script builder tool SB:
- The script builder tool SB provides general configuration options on script level which can be used by all rules including administrative functions to manage scripts.
- The script builder tool SB provides configuration of rules for the script including their evaluation expression, select data points to be shown together with the fault result, related runtime settings.
- The script builder tool SB allows a user to define runtime settings (input values) to control the rule execution. Values can be set by the end user prior to running a script.
- The script builder tool SB allows to define calculated fields accessible in data points and tagging and set publish options for the result grid and/or the result tree
- The script builder tool SB allows to select or to map data point types and node/asset properties relevant for the script and to define required virtual (calculated/derived) data points.

The script builder tool SB allows to select applicable node types for the script/rules and to define further filters based on node/asset properties for the complete script or individual rules.

The script builder tool SB allows to set the schedules for the script/rules for certain nodes/assets. Only faults detected within these schedules will be recognized as fault and shown to the user. The inheritance principle is applied for schedules, which means that they are taken for lower nodes as well when being defined on a higher node in the asset tree.

The script builder tool SB provides probable causes and suggests (mitigation) actions for rules. This helps the user to understand what to do if a certain fault has occurred.

The script builder tool SB allows to define the evaluation expression (logic) of the rule supported by selection lists for available custom functions, defined (virtual) data points and node/asset properties from the script level as well as runtime settings, calculated fields and global parameters.

The script builder tool SB provides an easy to understand function-in-function-in-function concept supporting the user in putting the logic together.

For different assets the same rules can be used if the assets have the same data points. E.g. two air handling units having the same data points can be analyzed by the same rule set. This provides a high reusability of rules or scripts.

The script builder tool SB is a tool to support the human operator (Energy, System, Application Engineer) in his daily job without advanced knowledge of a specific programming language or by consulting a software programmer. This safes time, allows the user to focus on the evaluation logic and leads to individual scripts that can be leveraged by all enabled users and be applied to many different customers and their portfolio of buildings.

The amount of time to define new rules and scripts is dramatically reduced as the engineers can work in an environment where they find terminology relevant for the technical domain and can use simplified expressions supported by a "function-in-function-in-function . . . " design to describe the logic, rather then having to develop complex programs. Users with a good know how of their technical domain can use the script builder SB, no programmers need to be involved in coding the rules. In that respect the engineers are self-sufficient in their daily work. While creating new rules or performing modifications to existing rules, the changes are directly available for the next execution in the runtime environment, once the script has been saved. No additional steps are required for compilation etc. (Change it-Save it-Run it).

Custom scripts/rules for individual customers can easily be created and assigned to the customers as everything is data/expression driven and stored in a global database. The script builder functionality itself can even be enabled for the customer himself. The cost involved in creating new rules for existing systems or new types of systems is reduced to a minimum. With the integration in a service platform system (e.g. Siemens Navigator platform) the lead time to the customer is very short, the tasks can be distributed to many individuals. This lowers the cost, and increases the efficiency and performance towards the customer for providing custom scripts and rules.

Figure 8:
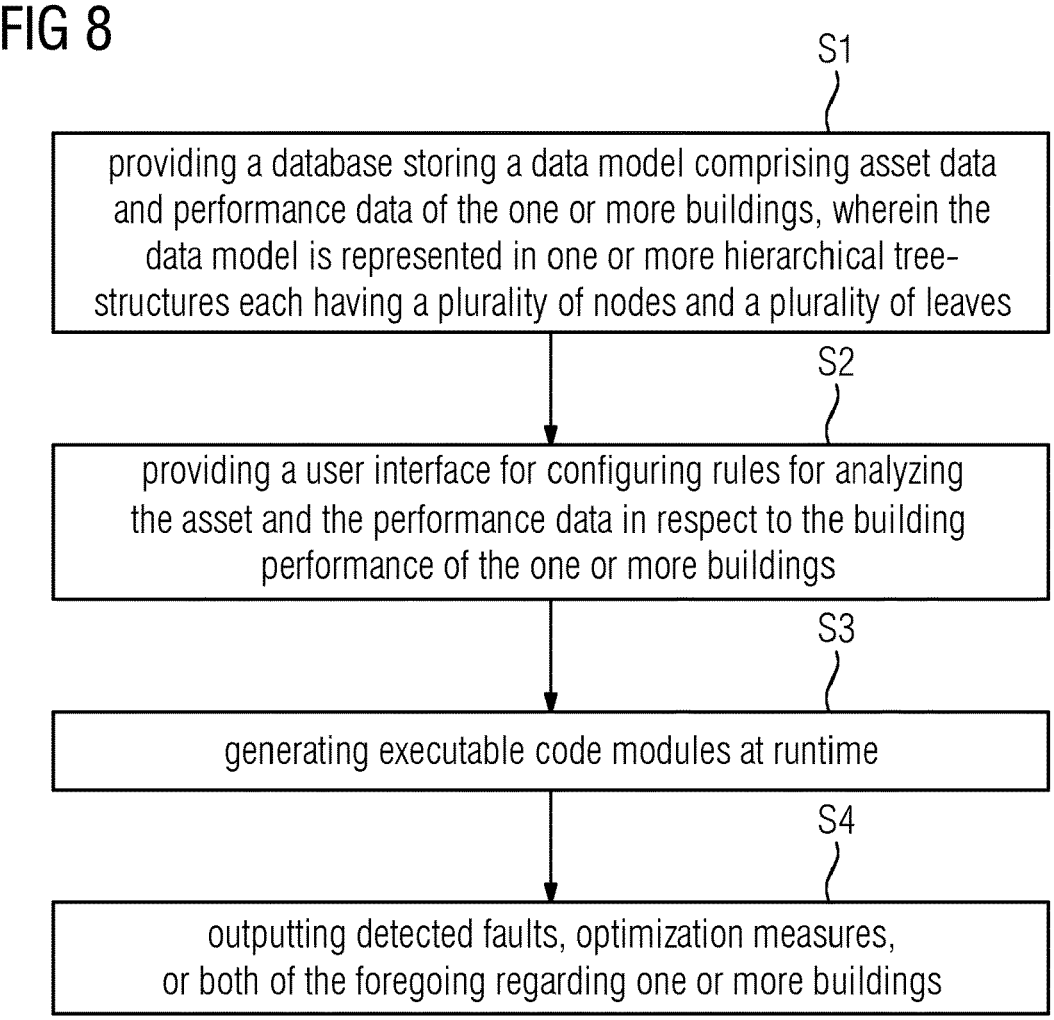
FIG. 8 shows an exemplary flow diagram depicting a process for detecting faults and/or for providing optimization measures to enhance the performance of one or more buildings in accordance with disclosed embodiments of the present invention.

FIG. 8 shows an exemplary flow diagram depicting a process for a computer-facilitated method for detecting faults, providing optimization measures, or both of the foregoing to enhance the performance of one or more buildings, including building automation equipment disposed in relation to the one or more buildings, the method comprising:

(S1) providing a database storing a data model comprising asset data and performance data of the one or more buildings, wherein the data model is represented in one or more hierarchical tree-structures each having a plurality of nodes and a plurality of leaves, wherein the nodes of the tree-structures represent asset data and the leaves of the tree-structures represent performance data of the one or more buildings, wherein the performance data are represented in each case by data points, wherein the data points comprise time series of measured or derived field values and meta information;

(S2) providing a user interface for configuring rules for analyzing the asset data and the performance data in respect to the building performance of the one or more buildings, wherein the rules refer to data point mappings, parameters, asset data mappings, runtime settings, or schedules and are configured by user input using logical operators and defined functions;

(S3) generating executable code modules at runtime based on the user configured rules by a processing unit, wherein the rules are executed by a runtime system traversing the tree-structures of the data model; and (S4) outputting detected faults, optimization measures, or both of the foregoing regarding the one or more buildings on an output device.

Advantageously the script execution is performed according to runtime settings. Runtime settings for example can be user defined thresholds, upper limits, or lower limits regarding the time series in the data points. Runtime settings offer a user defined parameterization for running the method. For example only data between an upper and a lower limit could be used by the script builder. This allows e.g. a quick presentation of results.

Advantageously traversing the tree-structures of the data model is performed according to the meta information of the data points. Meta data for a data point of a device installed in a building can be for instance an identification (identifier) for the data point, unit of measure, purpose (e.g. inlet temperature or return temperature). By knowing the relevant meta data or the semantic information in the time series of the data points traversing the tree-structure can be performed very effectively since the script builder has only to collect the data which are needed or required for performing a rule.

Advantageously the generated optimization measures comprise fault periods, selected data points, output columns, or fault diagnosis. This gives a customer flexibility and possibility to choose the outputted data and/or the format of the outputted data he needs for his requirements.

In an advantageous embodiment the optimization measures are inputted into a building management system for operating the one or more buildings. An operator can by using a management station (e.g. Desigo CC) of a building management system employ the recommended optimization measures to the respective buildings. Advantageously the building management system is directly coupled to a FDD system providing faults, optimization measures, or both of the foregoing for the respective buildings.

In a further advantageous embodiment the optimization measures are inputted directly into building automation equipment (infrastructure, devices) of the one or more buildings. In principle the optimization measures can be employed in real-time in the building automation equipment. Especially simple optimization measures can be employed in this approach, e.g. a recommended switch on or switch off of a device.

Further advantageous embodiments of the invention are a non-transient computer-readable medium (e.g. CD, SSD or USB stick) and computer program product (e.g. a program module written in an adequate programming language, e.g. C++, Java) comprising instructions for performing the inventive method for providing optimization or improvement measures for one or more buildings. The computer-readable medium and the computer program product having program segments for, when executed on a computer device, causing the computer device (e.g. workstation, desktop computer, Laptop, tablet) to implement the inventive method. The computer program product is directly or indirectly loadable into the memory of a digital computer.

Computer readable media can be any available media that can be accessed by a computer. By way of example, and not limitation, computer readable media can exemplary comprise computer storage media and communication media. Computer storage media comprises volatile and non volatile as well as removable and non-removable media implemented in any method or technology for storage of information such as computer readable instructions, data structures, program modules or other data. Computer storage media for example comprises RAM, ROM, EEPROM, flash memory or other memory technology, CDROM, digital versatile disks (DVD) or other optical disk storage, or any other medium which can be used to store the desired information and which can be accessed by a computer.

Figure 9:
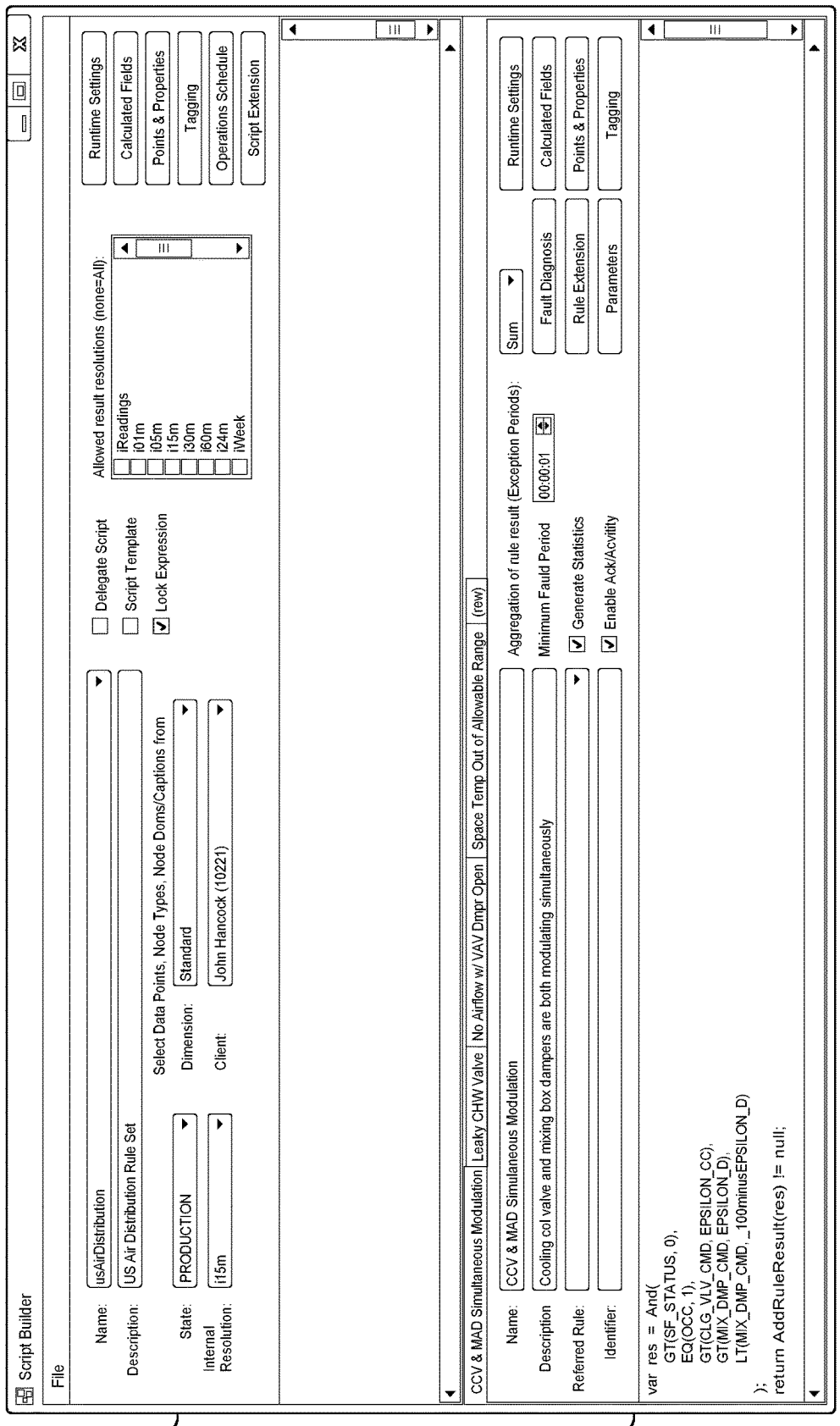
FIG. 9 illustrates an exemplary user interface for an exemplary script builder tool.

FIG. 9 illustrates an exemplary user interface for an exemplary script builder. The exemplary user interface comprises a script level SL and a rule level RL. The script level SL provides general configuration options which can be used by all rules and administrative functions to manage scripts. In the rule level RL a user configures a set of rules for the script including their evaluation expression, select data points to be shown together with the fault result, related runtime settings.

FIG. 10 shows an exemplary list LRS of runtime settings for configuring a script builder. Runtime Settings control the rule execution. Values (Settings) can be set by the end user prior to running a script.

FIG. 11 illustrates an exemplary user interface UI for defining calculated fields in data points. The user interface (UI) of the script builder allows to define calculated fields accessible in data points and tagging and set publish options for the result grid and/or the result tree.

FIG. 12 illustrates a further exemplary user interface UI for an exemplary script builder. The user interface UI shown in FIG. 12 allows a user to select/map data point types and node/asset properties relevant for the script and define required virtual (calculated/derived) data points.

Figure 13:
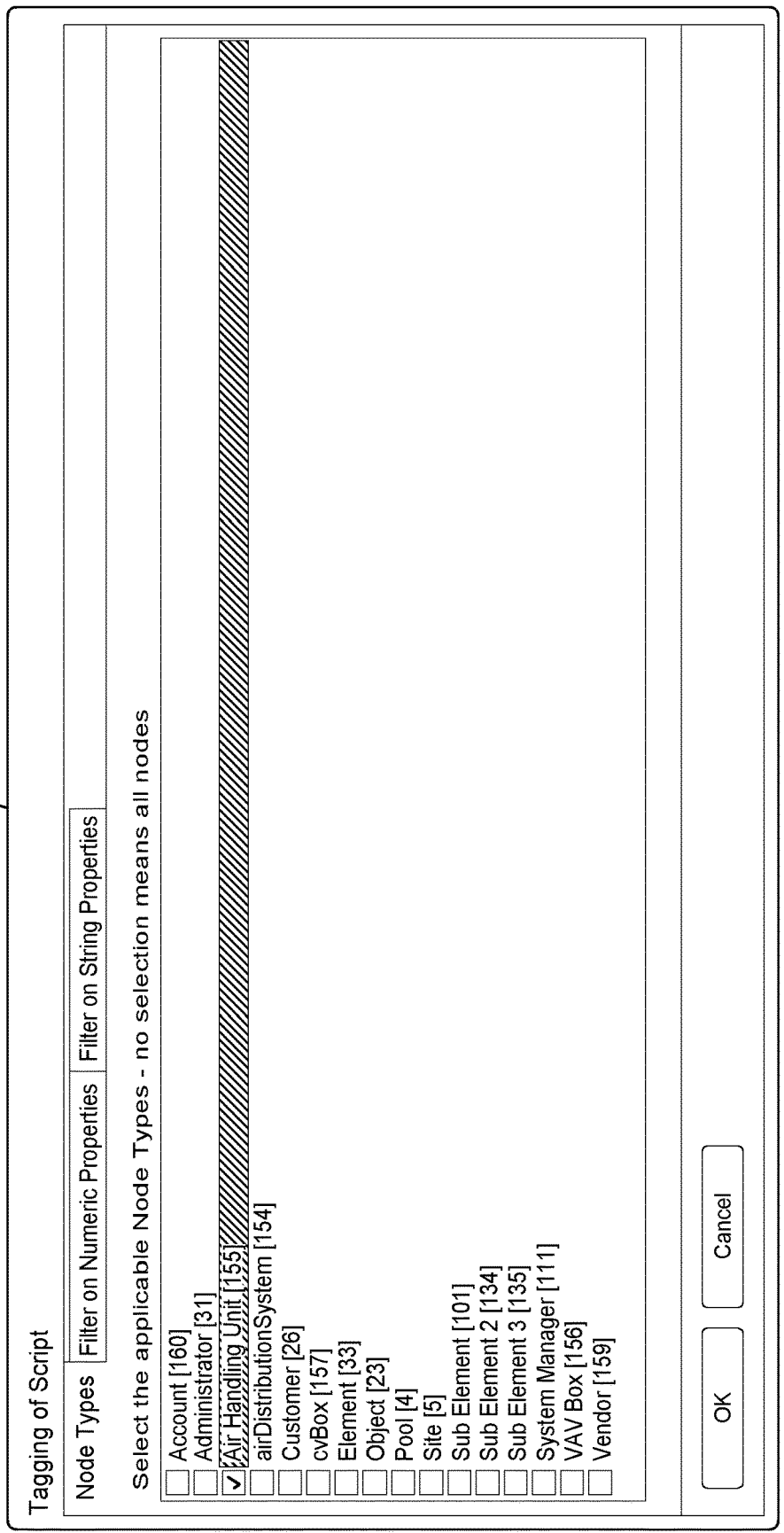
FIG. 13 illustrates an exemplary user interface of a script builder tool for tagging scripts or rules.

FIG. 13 illustrates an exemplary user interface UI for tagging scripts or rules. The user can select applicable node types for the script/rule and define further filters based on node/asset properties for the complete script or individual rules.

FIG. 14 illustrates an exemplary user interface UI for schedule settings. The user can set the schedules for the script or rules for certain nodes respective assets. Only faults detected within these schedules will be recognized as fault and shown to the user. The inheritance principle is applied for schedules, which means that they are taken for lower nodes as well when being defined on a higher node in the asset tree.

Figure 15:
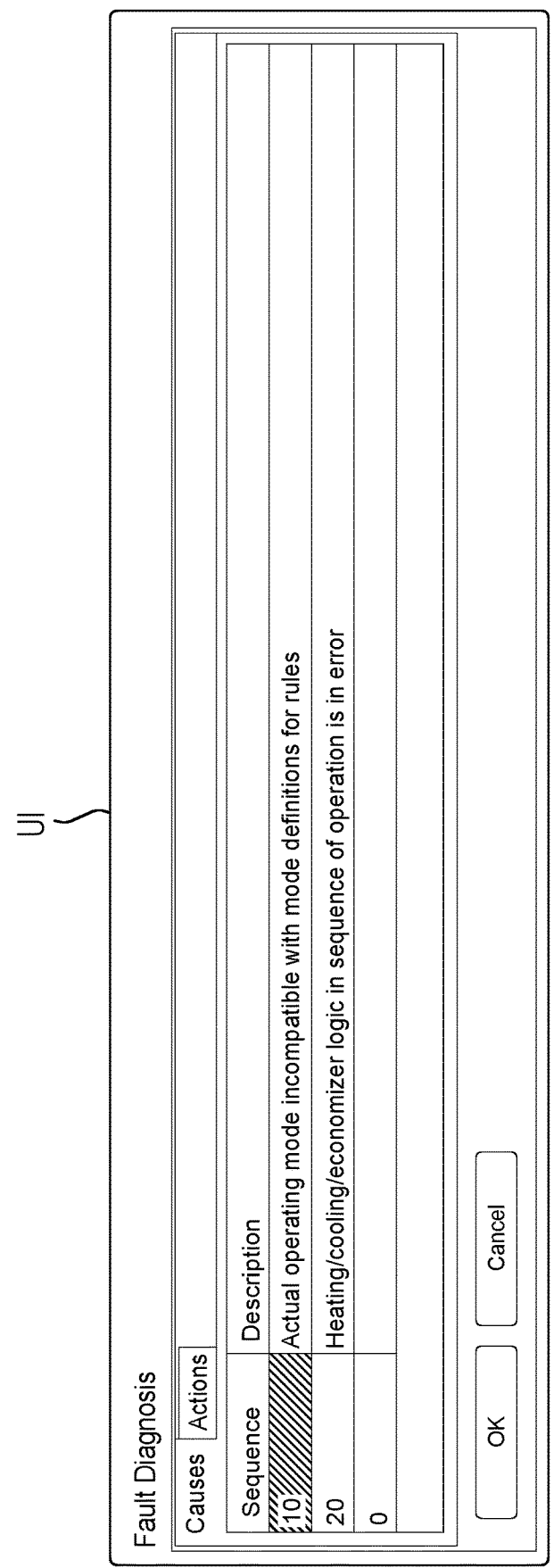
FIG. 15 illustrates an exemplary user interface of a script builder tool for fault diagnosis.

FIG. 15 illustrates an exemplary user interface UI for fault diagnosis. The system for detecting faults and/or for providing optimization measures to enhance the performance of one or more buildings can define probable causes and suggested (mitigation) actions for respective rules. This helps the user to understand what to do if a certain fault has occurred.

Figure 16:
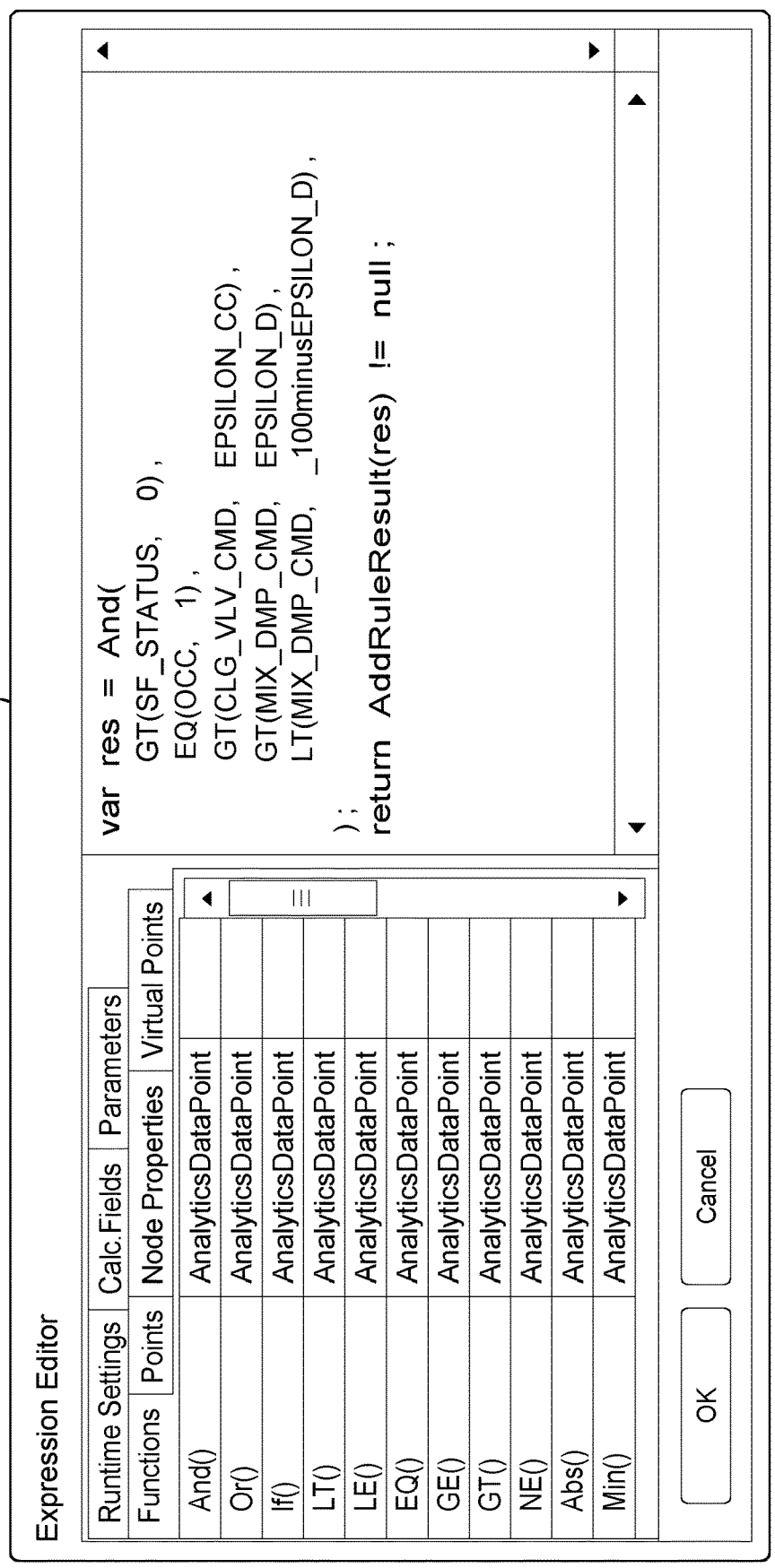
FIG. 16 illustrates an exemplary user interface for an expression editor for defining rules or part of rules.

FIG. 16 illustrates an exemplary user interface UI for an expression editor for defining rules or part of rules. A user can define the evaluation expression (logic) of the rule supported by selection lists for available custom functions, defined (virtual) data points and node/asset properties from the script level as well as runtime settings, calculated fields and global parameters. An easy to understand "function-in-function-in-function . . . " concept supports the user in putting the logic together.

Figure 17:
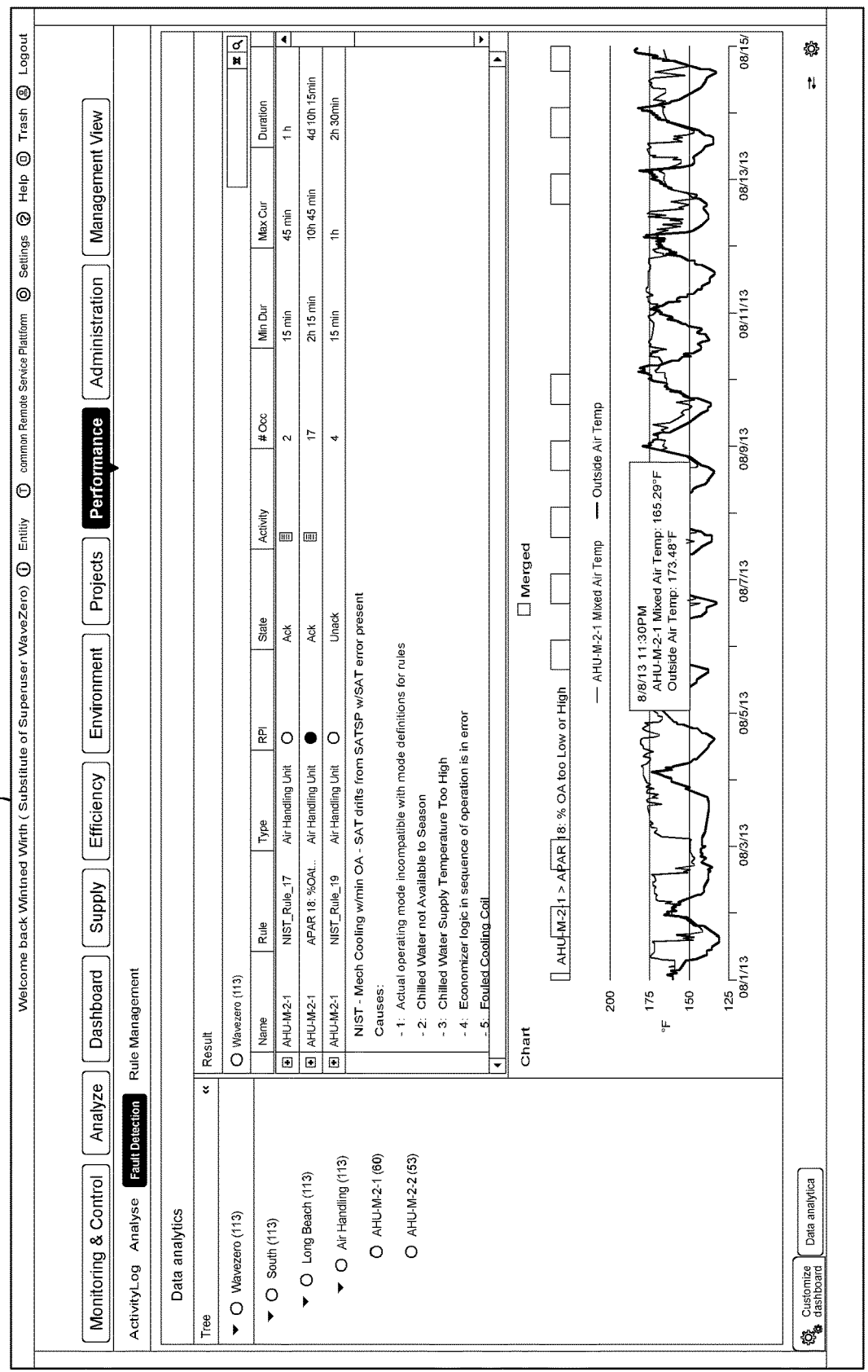
FIG. 17 shows an exemplary user interface of a system for presenting results in accordance with disclosed embodiments.

FIG. 17 shows an exemplary user interface UI for presenting results of script execution. The user interface UI according to FIG. 17 shows an exemplary dashboard for presenting the results, e.g. detected faults, defects and/or suggested optimization measures. The window on the left-hand side of the exemplary dashboard shows a hierarchy of a result tree. The tree hierarchy is be able to display numerical data next to the tree node name and the users are able to select what data parameters they would like to see (Example: Duration or Cost or Number of Faults or Trends). Advantageously the user is able to select a custom data field to be aggregated and displayed in the tree to the right of the Node Names.

Method and system for detecting faults and/or providing optimization measures to enhance the performance of one or more buildings, especially building automation equipment of the one or more buildings, wherein a database is provided for storing a data model comprising asset and performance data of the one or more buildings, wherein the data model is represented in one or more hierarchical tree-structures, wherein the nodes of the tree-structures represent asset data and the leaves of the tree-structures represent performance data of the one or more buildings, wherein the performance data are represented in each case by data points, wherein the data points comprising time series of measured or derived field values and meta information. Furthermore a user interface (e.g. a menu-driven user interface) is provided for configuring the rules for analyzing the asset and the performance data in respect to the building performance of the one or more buildings, wherein the rules referring to data point mappings, parameters, asset data mappings, runtime settings, or schedules are configured by user input using logical operators and defined functions. Executable code modules (e.g. dll-files) are generated at runtime by a processing unit based on the user configured rules, wherein the rules are executed by a runtime system traversing the tree-structures of the data model. An adequate output unit is provided for outputting detected faults and/or providing optimization measures for the one or more buildings.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

We claim:

1. A computer-facilitated method for detecting faults, providing optimization measures, or both of the foregoing to enhance the performance of one or more buildings, including building automation equipment disposed in relation to the one or more buildings, the method comprising:

through operation of at least one processor:
providing a database storing a data model comprising asset data and performance data of the one or more buildings,
wherein the data model is represented in one or more hierarchical tree-structures each having a plurality of nodes and a plurality of leaves,
wherein the nodes of the tree-structures represent asset data and the leaves of the tree-structures represent performance data of the one or more buildings,
wherein the performance data are represented in each case by data points,
wherein the data points comprise time series of measured or derived field values and meta information;
providing a user interface for configuring rules for analyzing the asset data and the performance data in respect to the building performance of the one or more buildings,
wherein the rules refer to data point mappings, parameters, asset data mappings, runtime settings, or schedules and are configured by user input using logical operators and defined functions;
generating executable code modules at runtime based on the user configured rules;
executing the rules by a runtime system traversing the tree-structures of the data model,
wherein traversing the tree-structures of the data model is based according to the meta information of the data points,
wherein executing the rules includes collecting at least one of the asset data or the performance data needed for performing the rules while traversing the tree-structure of the data model; and
outputting detected faults, optimization measures, or both of the foregoing regarding the one or more buildings through an output device.

2. The method according to claim 1, wherein the rule execution is performed according to runtime settings.

3. The method according to claim 1, further comprising:
outputting optimization measures regarding the one or more buildings through the output device, wherein the optimization measures include at least one of fault periods, selected data points, output columns, fault diagnosis, or any combination thereof.

4. The method according to claim 3, further comprising receiving input of the optimization measures into a building management system (BMS) for operating the one or more buildings.

5. The method according to claim 3, further comprising receiving input of the optimization measures into building automation equipment of the one or more buildings.

6. The method according to claim 1, further comprising:
outputting detected faults regarding the one or more buildings through the output device.

7. A system for detecting faults, providing optimization measures, or both of the foregoing to enhance the performance of one or more buildings, including building automation equipment disposed in relation to the one or more buildings, the system comprising:
a database storing a data model comprising asset data and performance data of the one or more buildings,
wherein the data model is represented in one or more hierarchical tree-structures each having a plurality of nodes and a plurality of leaves,
wherein the nodes of the tree-structures represent asset data and the leaves of the tree-structures represent performance data of the one or more buildings,
wherein the performance data are represented in each case by data points,
wherein the data points comprise time series of measured or derived field values and meta information;
at least one processor configured to:
generate a user interface that configures rules for analyzing the asset data and the performance data in respect to the building performance of the one or more buildings,
wherein the rules refer to data point mappings, parameters, asset data mappings, runtime settings, or schedules and are configured by user input using logical operators and defined functions;
generate executable code modules at runtime based on the user configured rules;
execute the rules by a runtime system traversing the tree-structures of the data model,
wherein traversing the tree-structures of the data model is based according to the meta information of the data points,
wherein executing the rules includes collecting at least one of the asset data or the performance data needed for performing the rules while traversing the tree-structure of the data model; and
cause an output device to output detected faults and/or optimization measures for the one or more buildings.

8. The system according to claim 7, wherein the rule execution is performed according to runtime settings.

9. The system according to claim 7, wherein the at least one processor is configured to cause the output device to output optimization measures for the one or more buildings, wherein the optimization measures comprise at least one of fault periods, selected data points, output columns, fault diagnosis, or any combination thereof, wherein the output device is a display of a computer monitor, a display of a handheld device, or the display of a monitor station of a building automation system (BMS).

10. The system according to claim 9, further comprising an interface to a building automation system (BMS) operating the one or more buildings, which interface is configured to enable input of the optimization measures into the BMS for operating the one or more buildings.

11. The system according to claim 9, further comprising an interface to a building automation equipment of the one or more buildings, which interface is configured to enable input of the optimization measures into the building automation equipment.

12. A non-transitory computer readable medium encoded with processor executable instructions that when executed by at least one processor, cause the at least one processor to carry out a method for detecting faults, providing optimization measures, or both of the foregoing to enhance the performance of one or more buildings, including building automation equipment disposed in relation to the one or more buildings, the method comprising:
providing a database storing a data model comprising asset data and performance data of the one or more buildings,
wherein the data model is represented in one or more hierarchical tree-structures each having a plurality of nodes and a plurality of leaves, wherein the nodes of the tree-structures represent asset data and the leaves of the tree-structures represent performance data of the one or more buildings, wherein the performance data are represented in each case by data points, wherein the data points comprise time series of measured or derived field values and meta information;

providing a user interface for configuring rules for analyzing the asset data and the performance data in respect to the building performance of the one or more buildings, wherein the rules refer to data point mappings, parameters, asset data mappings, runtime settings, or schedules and are configured by user input using logical operators and defined functions;

generating executable code modules at runtime based on the user configured rules;

executing the rules by a runtime system traversing the tree-structures of the data model, wherein traversing the tree-structures of the data model is based according to the meta information of the data points, wherein executing the rules includes collecting at least one of the asset data or the performance data needed for performing the rules while traversing the tree-structure of the data model; and outputting detected faults, optimization measures, or both of the foregoing regarding the one or more buildings through an output device.

13. The computer readable medium according to claim 12, wherein the rule execution is performed according to runtime settings.

14. The computer readable medium according to claim 12, further comprising outputting optimization measures regarding the one or more buildings through the output device, wherein the optimization measures include at least one of fault periods, selected data points, output columns, fault diagnosis, or any combination thereof.

15. The computer readable medium according to claim 14, further comprising receiving input of the optimization measures into a building management system (BMS) for operating the one or more buildings.

16. The computer readable medium according to claim 14, further comprising receiving input of the optimization measures into building automation equipment of the one or more buildings.

17. The computer readable medium according to claim 12, further comprising:

outputting detected faults regarding the one or more buildings through the output device.

* * * * *